(12) United States Patent
Korya et al.

(10) Patent No.: US 10,227,128 B2
(45) Date of Patent: Mar. 12, 2019

(54) FOLDING WING TIP AND ROTATING LOCKING DEVICE

(71) Applicant: AIRBUS OPERATIONS LIMITED, Bristol (GB)

(72) Inventors: Chetan Korya, Bristol (GB); Anthony Bryant, Bristol (GB); Matt Harding, Bristol (GB); David Brakes, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 297 days.

(21) Appl. No.: 15/152,798

(22) Filed: May 12, 2016

(65) Prior Publication Data

US 2016/0332723 A1  Nov. 17, 2016

(30) Foreign Application Priority Data

May 15, 2015  (GB) .................................. 1508424.7

(51) Int. Cl.
 *B64C 3/56* (2006.01)
 *B64C 23/06* (2006.01)
(52) U.S. Cl.
 CPC .............. *B64C 3/56* (2013.01); *B64C 23/072* (2017.05); *Y02T 50/164* (2013.01)
(58) Field of Classification Search
 CPC ....... B64C 3/56; B64C 23/072; B64C 23/065; B64C 13/28; Y02T 50/164
 See application file for complete search history.

(56) References Cited

U.S. PATENT DOCUMENTS

| 4,979,700 A | * | 12/1990 | Tiedeman | ............... B64C 13/34 244/198 |
| 5,350,135 A | | 9/1994 | Renzelmann et al. | |
| 5,427,329 A | | 6/1995 | Renzelmann et al. | |

(Continued)

FOREIGN PATENT DOCUMENTS

| EP | 2730499 A2 | 5/2014 |
| EP | 2730500 A2 | 5/2014 |

OTHER PUBLICATIONS

Search Report dated Nov. 12, 2015 in Great Britain Application No. 1508424.7.

(Continued)

*Primary Examiner* — Assres H Woldemaryam
(74) *Attorney, Agent, or Firm* — Nixon & Vanderhye P.C.

(57) ABSTRACT

The invention provides an aircraft wing, comprising a fixed wing and a wing tip device at the tip. The wing tip device is configurable between: (i) a locked flight configuration for use during flight and (ii) a ground configuration for use during ground-based operations. The wing further comprises a locking mechanism for locking the folding wing tip device in the locked flight configuration. A rotatable locking member is associated with one of the folding wing tip device and the fixed wing, and a locking pin associated with the other. The rotatable locking member comprises a guide surface to guide the locking pin to a locked configuration, in which the guide surface is shaped such that the locking pin is urged toward the rotation axis of the rotatable locking member by a camming action of the guide surface on the locking pin, thereby preloading the locking mechanism.

25 Claims, 8 Drawing Sheets

(56) References Cited

U.S. PATENT DOCUMENTS

| | | | | |
|---|---|---|---|---|
| 6,260,799 B1* | 7/2001 | Russ | ................... | B64C 3/56 |
| | | | | 244/49 |
| 7,600,297 B2* | 10/2009 | Gitnes | ................... | B64C 3/56 |
| | | | | 16/331 |
| 8,387,913 B2* | 3/2013 | Karem | ................... | B64C 3/56 |
| | | | | 244/102 SL |
| 8,876,473 B2* | 11/2014 | Westergaard | ........... | F03D 1/065 |
| | | | | 1/65 |
| 2014/0117151 A1 | 5/2014 | Fox et al. | | |
| 2015/0097087 A1* | 4/2015 | Sakurai | ................... | B64C 9/00 |
| | | | | 244/201 |
| 2015/0298793 A1* | 10/2015 | Fox | ................... | B64C 3/56 |
| | | | | 244/49 |

OTHER PUBLICATIONS

Search Report dated Sep. 29, 2016 in European Application No. 16169549.9.

* cited by examiner

FOLDING WING TIP AND ROTATING LOCKING DEVICE

RELATED APPLICATIONS

The present application claims priority from Great Britain Application Number 1508424.7, filed May 15, 2015, the disclosure of which is hereby incorporated by reference herein in its entirety.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage).

Therefore, folding wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

In order to securely fasten the folding wing tip device in the flight configuration, one or more locking mechanisms must be used. However, conventional locking mechanisms may not provide the secure fastening required for a folding wing tip. In particular, wear in a locking mechanism may result in there being play between the wing tip device and the fixed wing of the aircraft when in the flight configuration. Play may add to wear in the connection between the wing tip device and the fixed wing. Alternatively or additionally, play in the wing tip device may result in vibrations travelling down the fixed wing to the aircraft fuselage.

The present invention seeks to mitigate the above-mentioned problems. Alternatively or additionally, the present invention seeks to provide an improved wing tip device and locking mechanism.

SUMMARY OF THE INVENTION

The present invention provides according to a first aspect, an aircraft comprising an aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the folding wing tip device in the locked flight configuration, the locking mechanism comprising a rotatable locking member associated with one of the folding wing tip device and the fixed wing, and a locking pin associated with the other of the folding wing tip device and the fixed wing, the rotatable locking member comprising a guide surface arranged to guide the locking pin during rotation of the rotatable locking member to a locked configuration, in which the guide surface is shaped such that the locking pin is urged toward the rotation axis of the rotatable locking member by a camming action of the guide surface on the locking pin, thereby preloading the locking mechanism.

The rotatable locking member acts to preload the locking mechanism, such that any wear of the rotatable locking member and/or the locking pin is compensated for, thereby reducing the chances of play developing in the locking mechanism. The aircraft wing may comprise a first stop, into which the locking pin comes into contact when wing tip device is in the locked flight configuration, with the rotatable locking member acting to pull the locking pin against the first stop when in the locked position. Such an arrangement is advantageous because the first stop provides another point of contact for the locking pin, which when the wing tip device is in the locked flight configuration, provides another bearing surface for loads passing through the locking pin to react against. The aircraft wing may comprise a second stop, into which the locking pin comes into contact when the wing tip device is in the locked flight configuration, with the rotatable locking member acting to pull the locking pin against the second stop when in the locked position. Such an arrangement is advantageous because the second stop provides another point of contact for the locking pin, which when the wing tip device is in the locked flight configuration, provides another bearing surface for loads passing through the locking pin to react against. Providing a number of bearing surfaces for loads passing through the locking pin to react against may improve the stability and/or strength of the locking mechanism.

The rotatable locking member may be a disk comprising a groove, the groove defining the guide surface. The groove may be a portion of the disk that has been removed. The axis of rotation of the disk may be the centre of the disk. The groove may extend from an inner portion of the disk to the outside of the disk. The rotatable locking member is arranged such that rotating the locking member brings an initial portion of the groove into contact with the locking pin. The continued rotation of the locking member means that the locking pin moves along the guide surface, into a fully locked position. The distance between a point on the guide surface and the axis of rotation of the rotatable locking member decreases from an initial portion of the guide surface which guides the locking pin to a portion of the guide surface in contact with the locking pin when the locking mechanism is in the locked position. The outside of the disk may comprise a number of teeth 39. The teeth may be arranged to be engaged by a toothed drive mechanism 40 in contact with the outside of the disk. Rotation of the toothed drive mechanism may result in the rotation of the disk around the rotation axis of the disk. Therefore, the drive mechanism may be used to lock and unlock the locking mechanism. Alternative drive mechanisms may include a drive shaft connected to the centre of the rotatable locking member, the drive shaft powered by a motor unit, or a worm gear or a mechanical linkage arranged to rotate the rotatable locking member. The drive mechanism may be driven by a control unit 41. The control unit 41 may control the locking of the locking mechanism when the wing is in the flight configuration and the unlocking of the locking mechanism when the wing is to be moved into the ground configuration.

The aircraft wing may comprise a second locking mechanism. The second locking mechanism may comprise comprising a guide surface arranged to guide the locking pin during rotation of the second rotatable locking member to a locked configuration, in which the guide surface is shaped such that the locking pin is urged towards the rotation axis of the second rotatable locking member by a camming action of the groove on the locking pin, thereby preloading the second locking mechanism. Where the first locking mechanism and second locking mechanism engage with the same locking pin, the locking pin may comprise a split bearing, such that a first outer surface of the locking pin may rotate relative to, and possibly independently of, a second outer surface of the locking pin. The split bearing may act to reduce the friction between the guide surfaces of the first locking mechanism and second locking mechanism and the locking pin which may be created when engaging and disengaging the locking mechanism, as the outer surfaces of the locking pin, which are guided by the guide surface, may rotate when being guided into and out of the locked configuration. Reducing the friction in this way may reduce wear of the components, and also reduce the torque required to engage and disengage the locking mechanism. The reduced friction may also reduce the possibility of the components becoming jammed. The locking pin may comprise an additional engagement surface which is rotatable relative to the surfaces intended for engagement with the first locking mechanism and second locking mechanism. This engagement surface may be urged against the first stop and/or second stop when the locking mechanisms are in the locked configuration.

The second locking mechanism may comprise a second rotatable locking member and a second locking pin, the second rotatable locking member comprising a guide surface arranged to guide the second locking pin during rotation of the second rotatable locking member to a locked configuration, in which the guide surface is shaped such that the locking pin is urged towards the rotation axis of the second rotatable locking member by a camming action of the groove on the second locking pin, thereby preloading the second locking mechanism.

The second locking mechanism may be arranged to rotate in a plane parallel to the first locking mechanism but in the opposite direction. Providing such an arrangement may improve the load bearing capacity of the wing tip device and inner wing interface. The first locking mechanism and second locking mechanism may have the same axis of rotation.

Alternatively, the first locking mechanism and second locking mechanism may have different axes of rotation. Providing the first locking mechanism and second locking mechanism with different axes of rotation may increase the combined load bearing capabilities of the locking mechanisms, allowing loads in several different directions to be reacted through the first and second rotating locking mechanisms in different directions.

The aircraft wing may comprise a plurality of locking mechanisms as described, for example in a modular configuration, such that the locking mechanisms may be replaced or repaired as a modular unit, thereby reducing maintenance or repair time.

The aircraft wing may comprise a third rotatable locking mechanism 22" and a locking pin 32' arranged to be engaged by the third rotatable locking mechanism. The third rotatable locking mechanism may be arranged to rotate in a different plane to the first rotatable locking mechanism and second rotatable locking mechanism. The plane of rotation may be perpendicular to the plane of rotation of the first rotatable locking mechanism and second rotatable locking mechanism.

The wing tip device may be a wing tip extension; for example the wing tip device may be a planar tip extension. In other embodiments, the wing tip device may comprise, or consist of, a non-planar device, such as a winglet. In the flight configuration the trailing edge of the wing tip device is preferably a continuation of the trailing edge of a fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to a second aspect, the invention provides an aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the folding wing tip device in the locked flight configuration, the locking mechanism comprising a rotatable locking member associated with one of the folding wing tip device and the fixed wing, and a locking pin associated with the other of the folding wing tip device and the fixed wing, the rotatable locking member comprising a guide surface arranged to guide the locking pin during rotation of the rotatable locking member to a locked configuration, in which the guide surface is shaped such that the locking pin is urged toward the rotation axis of the rotatable locking member by a camming action of the guide surface on the locking pin, thereby preloading the locking mechanism.

According to a third aspect, the invention provides a method of locking a wing tip device in a locked flight configuration on an aircraft as described above, the method comprising the steps of: moving the wing tip device into the flight configuration and rotating the rotatable locking member to engage with the locking pin, such that the locking pin is urged towards the rotation axis of the rotatable locking member.

According to a fourth aspect, the invention provides a method of unlocking a wing tip device from a locked flight configuration on an aircraft as described above, the method comprising the step of rotating the rotatable locking member to disengage with the locking pin, such that the locking pin is no longer obstructed by the rotatable locking member.

According to a fifth aspect, the invention provides a locking mechanism, the locking mechanism comprising a rotatable locking member and a locking pin, the rotatable locking member comprising a guide surface arranged to guide the locking pin during rotation of the rotatable locking member to a locked configuration, in which the guide surface is shaped such that the locking pin is urged toward the rotation axis of the rotatable locking member by a camming action of the guide surface on the locking pin, thereby preloading the locking mechanism It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
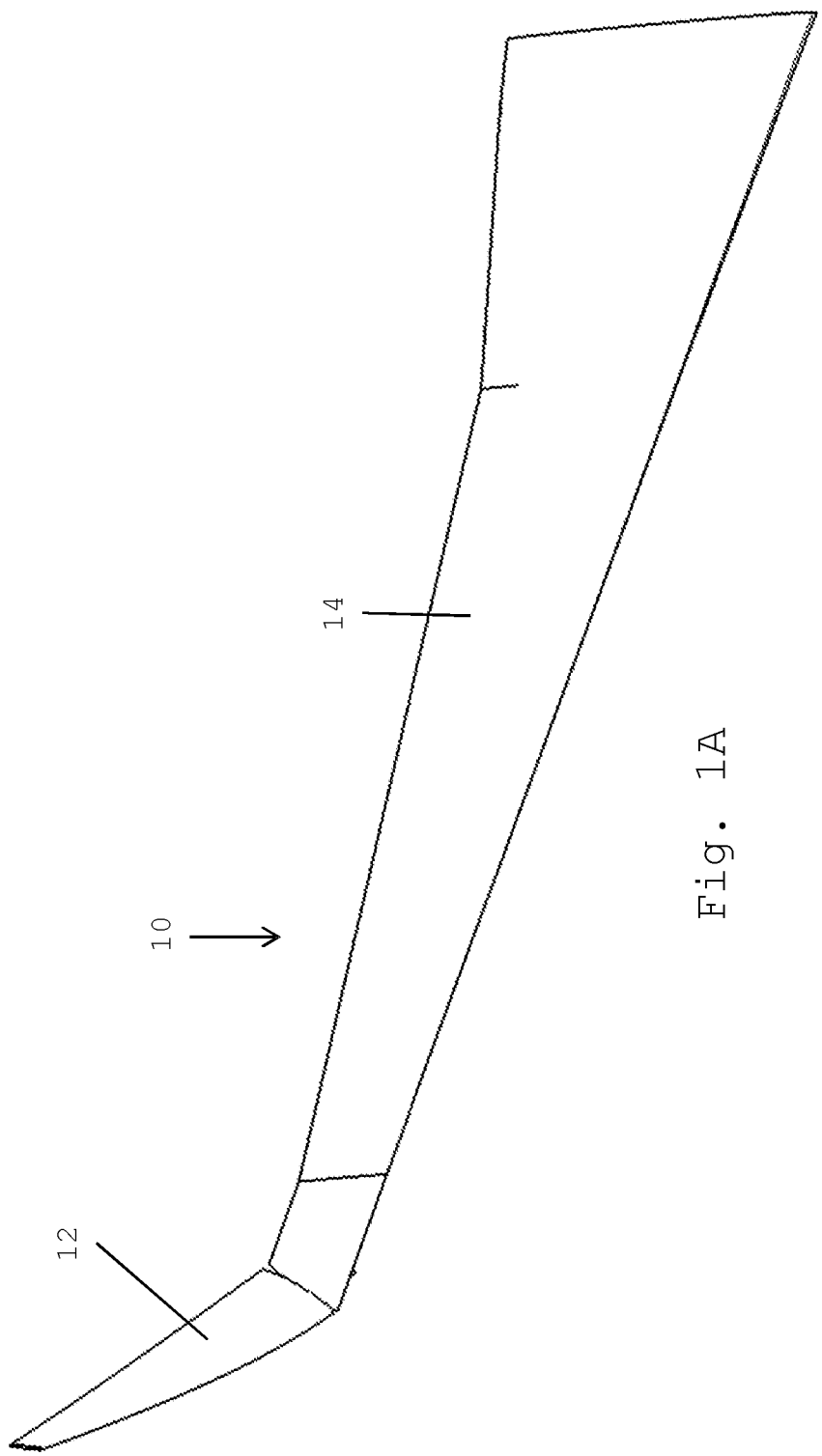
FIG. 1A shows a schematic view of a wing according to a first embodiment of the invention.
Figure 1B:
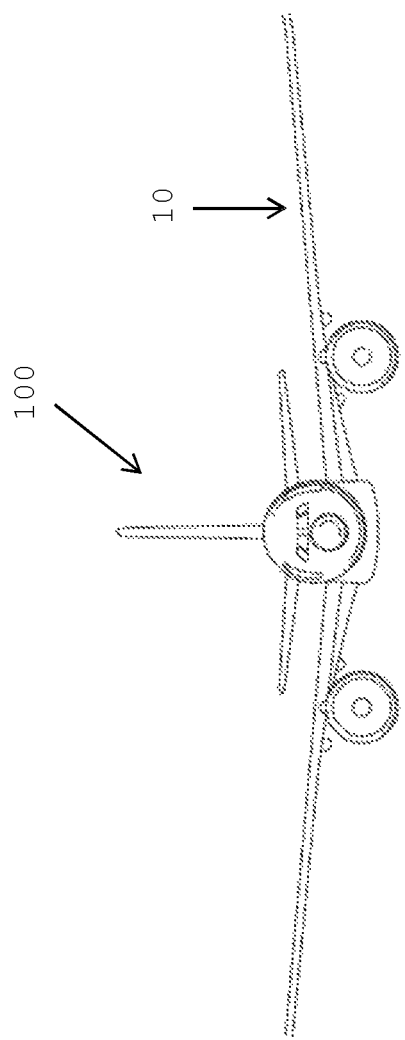
FIG. 1B shows a schematic view of an aircraft comprising a wing as shown in FIG. 1A
Figure 2:
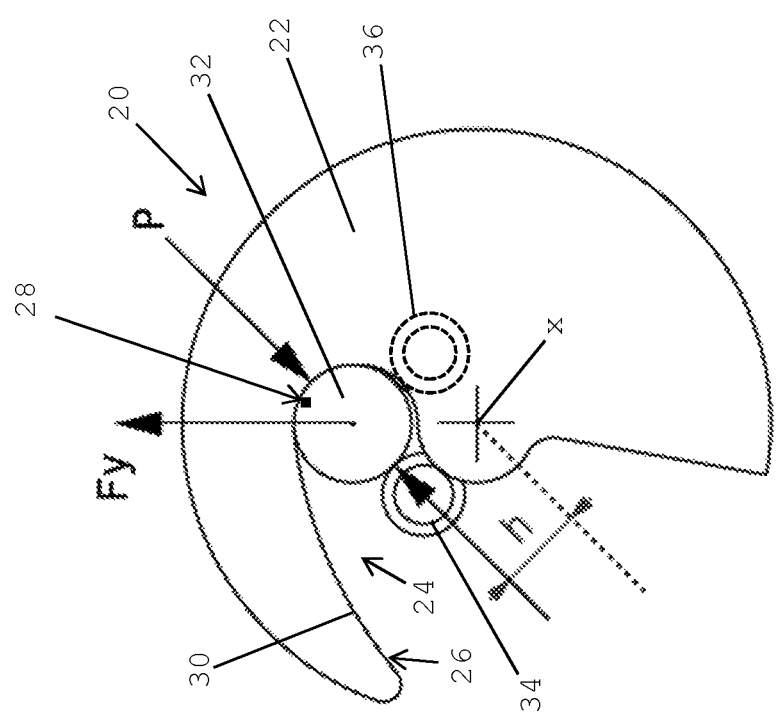
FIG. 2 shows a locking mechanism according to a second embodiment of the invention.

FIG. 1A shows a wing 10 comprising a wing tip device 12 and a fixed wing 14. FIG. 1B shows an aircraft 100 comprising the wing 10. The wing tip device 12 is configurable between: (i) a locked flight configuration for use during flight, as shown in FIG. 1B and (ii) a ground configuration for use during ground-based operations, as shown in FIG. 1A, in which ground configuration the wing tip device 12 is moved away from the locked flight configuration such that the span of the aircraft wing 10 is reduced, FIG. 2 shows a partial view of a locking mechanism 20 according to a first embodiment of the invention, which comprises a rotatable disk 22, with a cut away section including a groove 24 which provides a guide surface for guiding a locking pin. The disk is rotatably mounted around an axis of rotation X. Shown in the locked position, the disk 22 is mounted to a fixed wing 14 via a supporting member. The guide surface provided by the groove 24 includes an outer portion 26 and an inner portion 28, with a smooth guide surface 30 extending from the outer portion 26 to the inner portion 28. The distance between a point on the outer portion 26 of the guide surface and the axis of rotation X is greater than the distance between a point on the inner portion 28 of the guide surface and the axis of rotation X, meaning that as a locking pin is guided along the guide surface, it is effectively pulled towards the axis of rotation X. FIG. 2 also shows a locking pin 32 located in contact with the inner portion 28, the guide surface 30 in contact with the locking pin 32 at the inner portion 28 being perpendicular to a line drawn between the contact point and the axis of rotation X. The locking pin 32 is attached to the wing tip device 12, and is located such that when the wing tip device 12 is in the flight configuration, the locking pin 32 is in the region of the disk 22, and may be engaged by the groove 24. Once engaged by the groove 24 and the rotatable disk 22 is rotated such that the locking pin 32 is guided into the inner portion 28 of the guide surface, the locking pin 32 may not be moved, and the wing tip device 12 is locked in the flight configuration. When the wing tip device 12 is in the ground configuration, the locking pin 32 has moved away from the region of the disk 22 and does not obstruct movement of the wing tip device. In order to lock and unlock the locking mechanism, the rotating locking mechanism 20 is rotated into and out of engagement with the locking pin 32. To unlock the rotating locking mechanism 20 as shown in FIG. 2, the disk 22 is rotated about the rotation axis X in a clockwise direction, whereupon the locking pin 32 is guided along the guide surface, from the inner portion 28, along the cam surface 30, to the outer portion 26, and then out of contact with the disk 22. When there is no longer any contact between the locking pin 32 and the disk 22, the locking pin 32 is no longer obstructed by the disk 22, and the wing tip device 12 may be moved by an actuator (not shown) from the flight configuration to the ground configuration. To lock wing tip device 12 in the flight configuration from being in the ground configuration, the reverse of the described process occurs. The wing tip device 12 is actuated by an actuator (not shown) from the ground configuration to the flight configuration. The locking pin 32 is therefore brought into the region of the disk 22. The disk 22 is rotated around the rotation axis X in an anti-clockwise direction, such that the locking pin 32 is captured by the outer portion 26 of the guide surface, guided along the guide surface 30 as the disk 22 rotates, to the inner portion 28. The dimensions of the groove 24 will pull the locking pin 32 towards the axis of rotation X because of the decreasing distance between points on the guide surface 30 and the axis of rotation X, and also urge the locking pin 32 towards the axis X once the rotation is stopped and the locking pin 32 is located at the inner portion 28.

FIG. 2 also shows a first stop 34 and second stop 36 (shown by dotted lines due to the view being obstructed by the disk 22. The first stop 34 and second stop 36 are located such that they are contacted by the locking pin 32 when the locking mechanism is in the locked flight configuration, and the locking pin 32 is urged or pulled against the first stop 34 and second stop 36 due to the dimensions of the groove. The first stop 34 and second stop 36 provide additional bearing surfaces through which loads on the locking pin 32 may be reacted. As can be seen in FIG. 2, the first stop 34 and second stop 36 are located between the contact point between the inner portion 28 and the locking pin and the axis of rotation X. Therefore, the groove 24 acts on the locking pin 32 to pull the locking pin 32 against the first stop 34 and second stop 36, as well as pulling the locking pin 32 towards the axis of rotation X. Therefore, the locking pin 32 is securely fastened in three different directions, and three different bearing surfaces are provided for reacting loads experienced by the locking pin 32.

Figure 3:
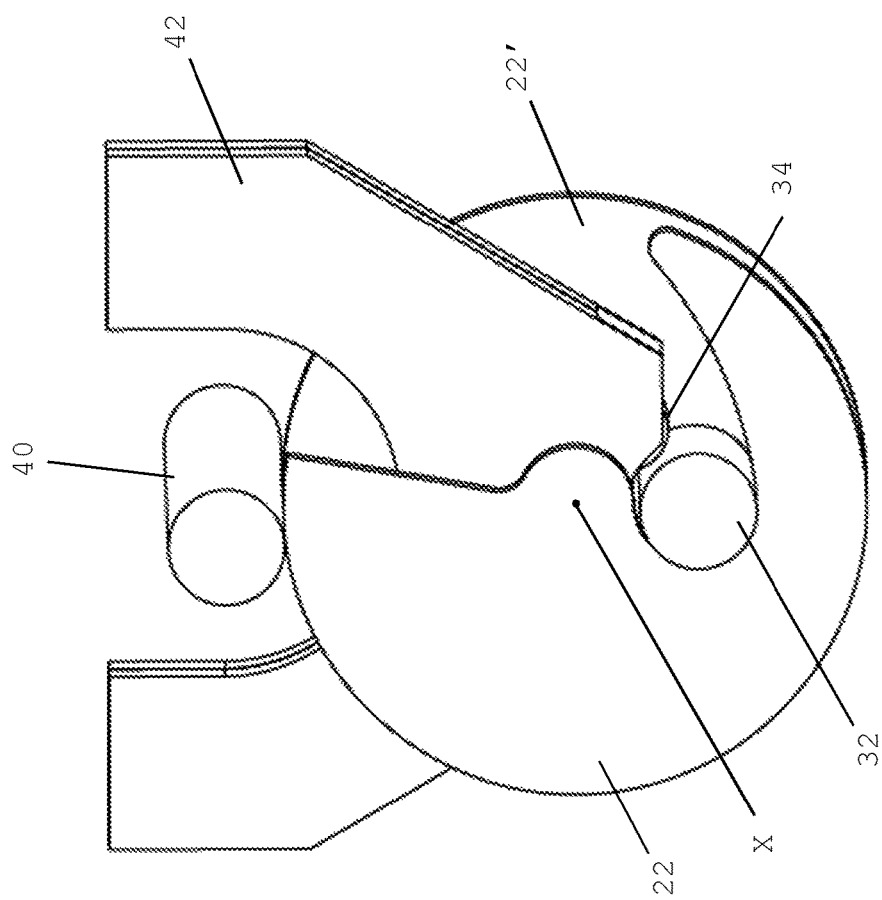
FIG. 3 shows a locking mechanism according to a third embodiment of the invention.
Figure 4:
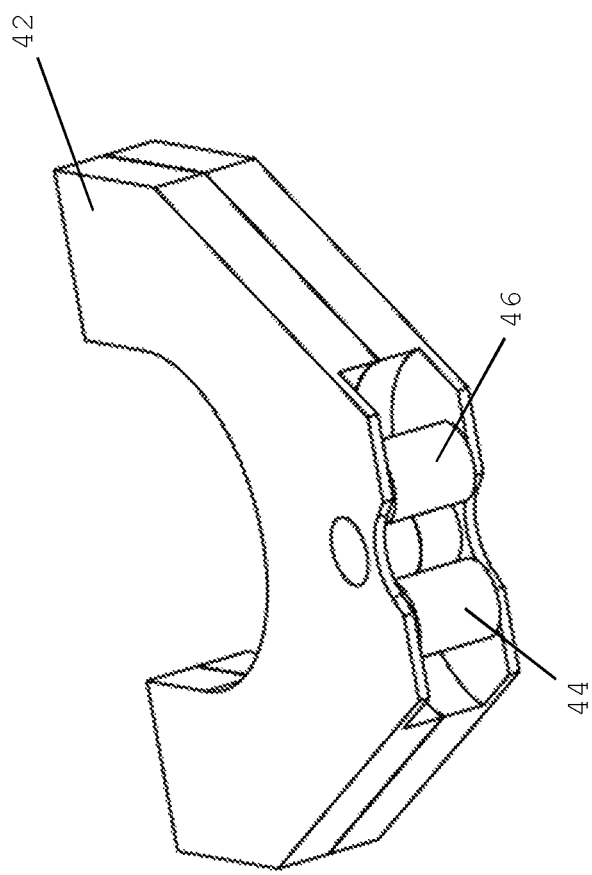
FIG. 4 shows a support device associated with the locking mechanism as shown in FIG. 3.

FIG. 3 shows a second embodiment of the invention, with a first disk 22 as described with reference to FIG. 2, and a second disk 22', the same shape as the first disk 22, with the same axis of rotation X, but flipped in orientation, so the disk 22' rotates in the opposite direction to the disk 22 to engage and disengage with the locking pin 32. FIG. 3 also shows a drive mechanism 40, which drives the rotation of the disk 22 in one direction whilst also driving the rotation of the disk 22' in the opposite direction. This may be by a tooth and ratchet arrangement for each disk 20, 22', or any other suitable drive mechanism as will be appreciated by the skilled person. FIG. 4 also shows a support arm 42 to which the locking disks 22, 22' are rotatably mounted, and stops 44 and 46 in the form of rotatable rollers. The stops 44 and 46 are brought into contact with the locking pin 32 as described with reference to FIG. 2.

Figure 5:
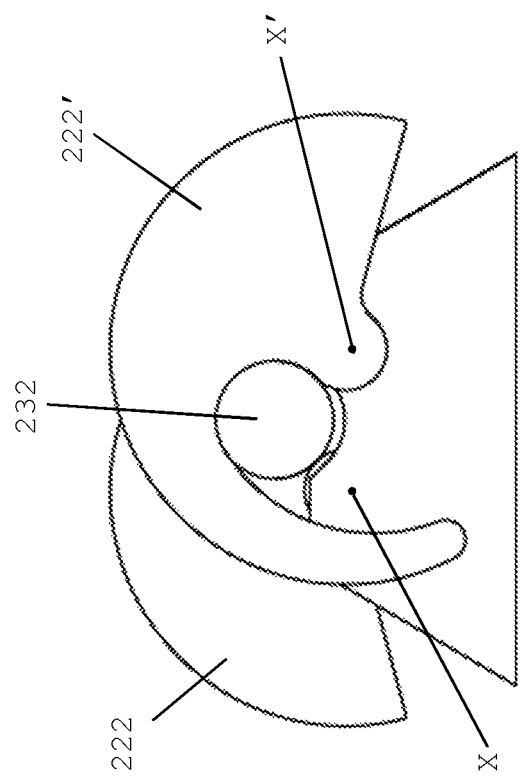
FIG. 5 shows a locking mechanism according to a fourth embodiment of the invention.

FIG. 5 shows a third embodiment of the invention. FIG. 5 shows a first disk 222 and second disk 222', in a similar configuration to that described in FIGS. 3 and 4, though with the axes of rotation X, X' of the first disk 222 and second disk 222' spaced apart from each other. As can be seen, this arrangement provides the locking pin 232 with bearing surfaces at different points, allowing loads experienced by the locking pin 232 to be reacted in different directions.

Figure 6:
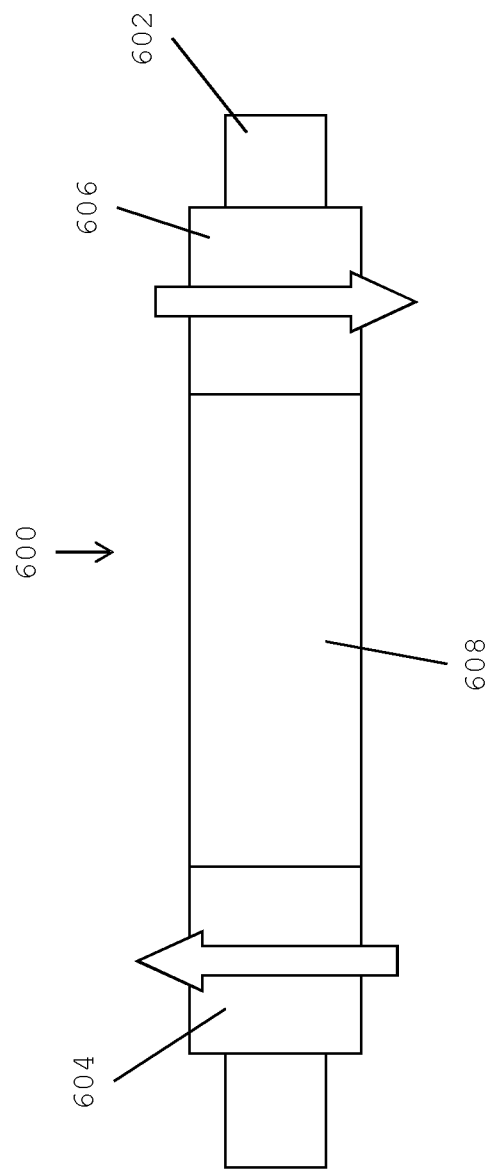
FIG. 6 shows a locking pin which may be used in a locking mechanism according to any of the above described embodiments of the invention.
Figure 7:
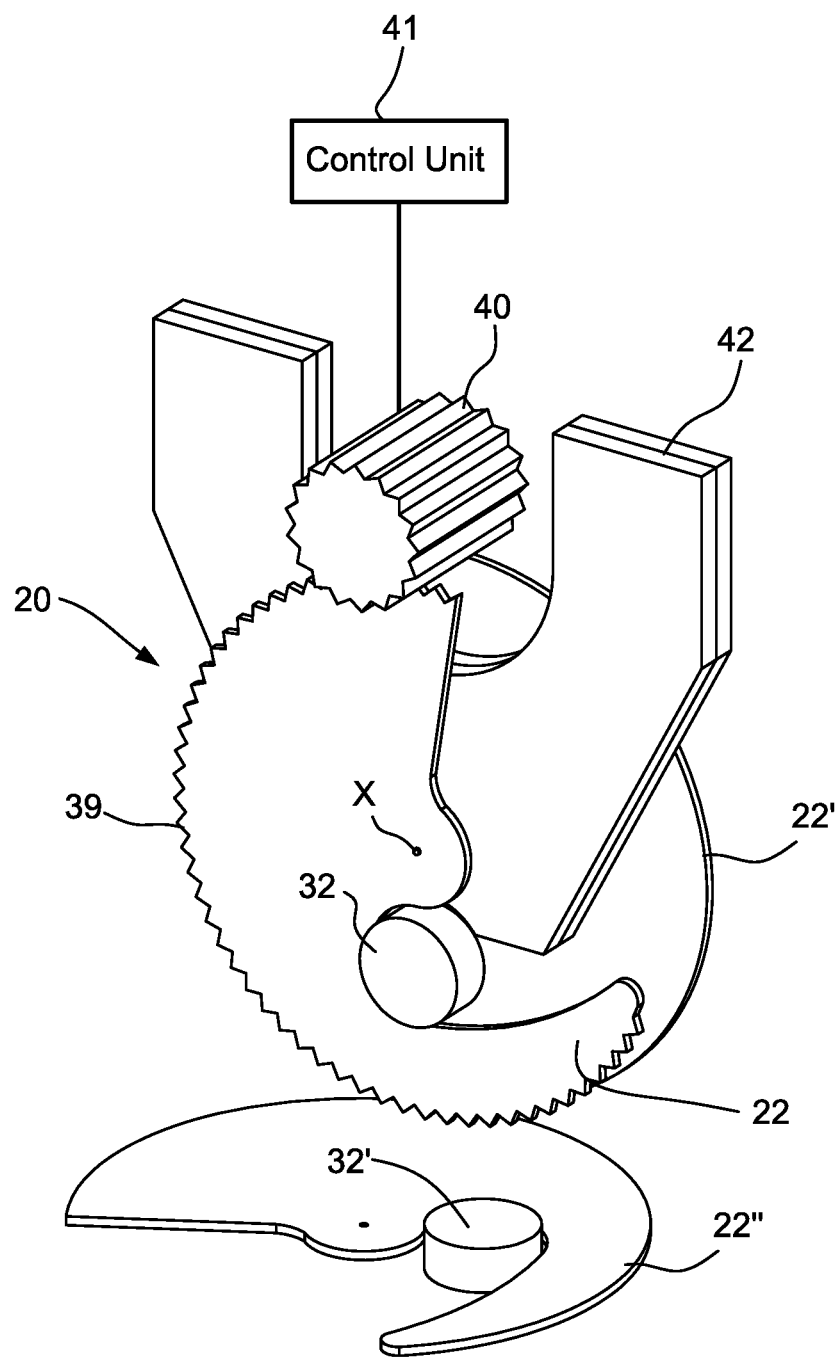
FIG. 7 shows a locking mechanism according to a fourth embodiment of the invention.

FIG. 6 shows a locking pin 600 which may be used as part of a locking mechanism as described in the above embodiments of the invention. The locking pin 600 comprises a central pin 602 on which a first rotatable outer surface 604 and second rotatable outer surface 606 is mounted. The two outer surfaces 604, 606, are located to be guided by the guide surfaces of the first locking mechanism and second locking mechanism, and are free to rotate whilst being guided. The arrows in FIG. 6 indicate that the outer surfaces may rotate independently, and in opposite directions to each other. Therefore, the friction between the two outer surfaces 604 and 606 is reduced compared to an arrangement when the outer surfaces 604 and 606 are not able to rotate. The locking pin 600 also includes a roller interface 608 located between the outer surfaces 604 and 606, which is located for being urged against the stops of a locking mechanism. The roller interface may be rotatable around the central pin 602 in some embodiments of the invention, or alternatively may be fixed relative to the central pin 602. In FIG. 6 the first rotatable outer surface 604 and second rotatable outer surface 606 are shown as sandwiching the roller interface 608, but in alternative embodiments, depending on how the locking mechanisms are arranged, the first outer surface 604 and second outer surface 606 may be adjacent to each other, and the roller interface 608 may be located to either or both sides of the first outer surface 604 and second outer surface 606.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Whilst the locking member has been described as a disk, the skilled person will realise that alternative external shapes may be used and the same effect provided, as long as the shape of the groove in the locking member acts on the locking pin in the appropriate way. Alternative actuation methods for rotating the locking member may also be provided, as would be appreciated by the skilled person.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising an aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the folding wing tip device in the locked flight configuration, the locking mechanism comprising a rotatable locking member associated with one of the folding wing tip device and the fixed wing, and a locking pin associated with the other of the folding wing tip device and the fixed wing, the rotatable locking member comprising a guide surface arranged to guide the locking pin during rotation of the rotatable locking member to a locked configuration, in which the guide surface is shaped such that the locking pin is urged toward the rotation axis of the rotatable locking member by a camming action of the guide surface on the locking pin, thereby preloading the locking mechanism, and wherein the distance between a point on the guide surface and the axis of rotation of the rotatable locking member decreases from an initial portion of the guide surface which guides the locking pin to a portion of the guide surface in contact with the locking pin when the locking mechanism is in the locked position.

2. The aircraft as claimed in claim 1, the aircraft wing comprising a first stop, into which the locking pin comes into contact when wing tip device is in the locked flight configuration, with the rotatable locking member acting to urge the locking pin against the first stop when in the locked position.

3. The aircraft as claimed in claim 2, the aircraft wing comprising a second stop, into which the locking pin comes into contact when the wing tip device is in the locked flight configuration, with the rotatable locking member acting to urge the locking pin against the second stop when in the locked position.

4. The aircraft as claimed in claim 1, wherein the rotatable locking member is a disk comprising a groove, the groove including the guide surface.

5. An aircraft comprising an aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the folding wing tip device in the locked flight configuration, the locking mechanism comprising a rotatable locking member associated with one of the folding wing tip device and the fixed wing, and a locking pin associated with the other of the folding wing tip device and the fixed wing, the rotatable locking member comprising a guide surface arranged to guide the locking pin during rotation of the rotatable locking member to a locked configuration, in which the guide surface is shaped such that the locking pin is urged toward the rotation axis of the rotatable locking member by a camming action of the guide surface on the locking pin, thereby preloading the locking mechanism, wherein the rotatable locking member is a disk comprising a groove, the groove including the guide surface, and wherein the groove is formed as result of a portion of the disk that has been removed.

6. The aircraft as claimed in claim 4, wherein the axis of rotation of the disk is the center of the disk.

7. The aircraft as claimed in claim 4, wherein the groove extends from an inner portion of the disk to the outside of the disk.

8. An aircraft comprising an aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the folding wing tip device in the locked flight configuration, the locking mechanism comprising a rotatable locking member associated with one of the folding wing tip device and the fixed wing, and a locking pin associated with the other of the folding wing tip device and the fixed wing, the rotatable locking member comprising a guide surface arranged to guide the locking pin during rotation of the rotatable locking member to a locked configuration, in which the guide surface is shaped such that the locking pin is urged toward the rotation axis of the rotatable locking member by a camming action of the guide surface on the locking pin, thereby preloading the locking mechanism wherein the rotatable locking member is a disk comprising a groove, the groove including the guide surface, and wherein the outside of the disk comprises a plurality of teeth.

9. The aircraft as claimed in claim 8, wherein the teeth are arranged to be engaged by a toothed drive mechanism in contact with the outside of the disk.

10. The aircraft as claimed in claim 9, wherein the drive mechanism is driven by a control unit.

11. The aircraft as claimed in claim 10, wherein the control unit controls the locking of the locking mechanism when the wing is in the flight configuration and the unlocking of the locking mechanism when the wing is to be moved into the ground configuration.

12. The aircraft as claimed in claim 1, wherein the locking pin is rotatably mounted.

13. The aircraft as claimed in claim 1, wherein the aircraft wing comprises a second locking mechanism.

14. The aircraft as claimed in claim 13, wherein the second locking mechanism comprises a second rotatable locking member, the second rotatable locking member comprising a guide surface arranged to guide the locking pin during rotation of the second rotatable locking member to a locked configuration, in which the guide surface is shaped such that the same locking pin is urged towards the rotation axis of the second rotatable locking member by a camming action of the groove on the locking pin, thereby preloading the second locking mechanism.

15. The aircraft as claimed in claim 13, wherein the second locking mechanism comprises a second rotatable locking member and a second locking pin, the second rotatable locking member comprising a guide surface arranged to guide the second locking pin during rotation of the second rotatable locking member to a locked configuration, in which the guide surface is shaped such that the locking pin is urged towards the rotation axis of the second rotatable locking member by a camming action of the groove on the second locking pin, thereby preloading the second locking mechanism.

16. The aircraft as claimed in claim 13 wherein the second locking mechanism is arranged to rotate in a plane parallel to the plane of rotation of the first locking mechanism but in the opposite direction.

17. The aircraft as claimed in claim 13, wherein the first locking mechanism and second locking mechanism have the same axis of rotation.

18. The aircraft as claimed in claim 13 wherein the first locking mechanism and second locking mechanism have different axes of rotation.

19. The aircraft as claimed in claim 13, wherein the locking pin comprises a first outer surface and second outer surface, the first outer surface and second outer surface arranged to be rotatable relative to each other.

20. The aircraft as claimed in claim 13, wherein the aircraft wing comprises a third rotatable locking mechanism and a locking pin arranged to be engaged by the third rotatable locking mechanism.

21. The aircraft as claimed in claim 20, wherein the third rotatable locking mechanism is arranged to rotate in a different plane to the first rotatable locking mechanism and second rotatable locking mechanism.

22. The aircraft as claimed in claim 21, wherein the plane of rotation of the third locking mechanism is perpendicular to the plane of rotation of the first rotatable locking mechanism and second rotatable locking mechanism.

23. An aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the folding wing tip device in the locked flight configuration, the locking mechanism comprising a rotatable locking member associated with one of the folding wing tip device and the fixed wing, and a locking pin associated with the other of the folding wing tip device and the fixed wing, the rotatable locking member comprising a guide surface arranged to guide the locking pin during rotation of the rotatable locking member to a locked configuration, in which the guide surface is shaped such that the locking pin is urged toward the rotation axis of the rotatable locking member by a camming action of the guide surface on the locking pin, thereby preloading the locking mechanism, and wherein the distance between a point on the guide surface and the axis of rotation of the rotatable locking member decreases from an initial portion of the guide surface which guides the locking pin to a portion of the guide surface in contact with the locking pin when the locking mechanism is in the locked position.

24. A method of locking a wing tip device in a locked flight configuration on an aircraft as claimed in claim 1, the method comprising the steps of: moving the wing tip device into the flight configuration and rotating the rotatable locking member to engage with the locking pin, such that the locking pin is urged towards the rotation axis of the rotatable locking member.

25. A method of unlocking a wing tip device from a locked flight configuration on an aircraft as claimed in claim 1, the method comprising the step of rotating the rotatable locking member to disengage with the locking pin, such that the locking pin is no longer obstructed by the rotatable locking member.

* * * * *